US007251732B2

(12) United States Patent
Jamieson et al.

(10) Patent No.: US 7,251,732 B2
(45) Date of Patent: Jul. 31, 2007

(54) PASSWORD SYNCHRONIZATION IN A SIGN-ON MANAGEMENT SYSTEM

(75) Inventors: Steve Jamieson, Bellevue, WA (US); Anil Balakrishnan, Sammamish, WA (US); Christopher Robert Houser, Woodinville, WA (US); Rex George Torres, Snohomish, WA (US); Guy Paul Larsen, Sammamish, WA (US); Joseph W. Sharp, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 658 days.

(21) Appl. No.: 10/464,627

(22) Filed: Jun. 18, 2003

(65) Prior Publication Data

US 2004/0260953 A1     Dec. 23, 2004

(51) Int. Cl.
*H04L 9/32*     (2006.01)
(52) U.S. Cl. ............................... 713/182; 726/2; 726/8; 726/9; 726/10
(58) Field of Classification Search ................ 713/182; 726/2, 8, 9–10
See application file for complete search history.

(56) References Cited

U.S. PATENT DOCUMENTS

| 5,604,490 A | 2/1997 | Blakley, III et al. ..... 340/825.31 |
| 5,611,048 A | 3/1997 | Jacobs et al. .......... 395/200.09 |
| 5,655,077 A | 8/1997 | Jones et al. ............ 395/187.01 |
| 5,689,638 A | 11/1997 | Sadovsky .............. 395/188.01 |
| 5,719,941 A | 2/1998 | Swift et al. .................... 380/25 |
| 5,764,890 A | 6/1998 | Glasser et al. ......... 395/188.01 |
| 5,768,503 A * | 6/1998 | Olkin ............................. 726/5 |
| 5,768,504 A | 6/1998 | Kells et al. ............ 395/187.01 |
| 5,797,030 A | 8/1998 | Hoaby ........................ 395/827 |
| 5,908,469 A | 6/1999 | Botz et al. .................. 713/201 |
| 6,006,334 A | 12/1999 | Nguyen et al. ............. 713/202 |
| 6,154,843 A | 11/2000 | Hart, Jr. et al. ............. 713/201 |
| 6,178,511 B1 | 1/2001 | Cohen et al. ............... 713/201 |
| 6,223,292 B1 | 4/2001 | Dean et al. ................. 713/202 |
| 6,243,816 B1 | 6/2001 | Fang et al. ................. 713/202 |
| 6,275,944 B1 | 8/2001 | Kao et al. ................... 713/202 |
| 6,308,273 B1 | 10/2001 | Goertzel et al. ............ 713/201 |
| 6,377,994 B1 | 4/2002 | Ault et al. .................. 709/229 |
| 6,389,543 B1 | 5/2002 | Dawson et al. ............. 713/202 |

(Continued)

OTHER PUBLICATIONS

Asaravala, A., "A Question of Identity, Passport, Liberty, and the Single Sign-On Race", *New Architect*, 2003, 8(1), 4 pages.

(Continued)

*Primary Examiner*—Taghi T. Arani
(74) *Attorney, Agent, or Firm*—Woodcock Washburn LLP

(57) ABSTRACT

A mechanism that synchronizes passwords maintained for plural domains. A user maintains accounts in two domains. The first and second domains each maintain tables correlating userIDs with passwords, such that the same user's password can be different in the different domains. A database stores tables that correlate a given user's userID/password combination in the first domain with his corresponding userID/password combination in the second domain. The database is used to sign the user onto one domain when the user is working in the other domain. When the user changes his password in the first domain, the change is reported to the database, so that the database stores the current password. Optionally, the password change may be reported to the second domain, such that the user will have the same password in both domains.

19 Claims, 7 Drawing Sheets

U.S. PATENT DOCUMENTS

| | | |
|---|---|---|
| 6,442,695 B1 | 8/2002 | Dutcher et al. ............. 713/201 |
| 6,983,377 B1* | 1/2006 | Beesley et al. ............... 726/12 |
| 2002/0078386 A1* | 6/2002 | Bones et al. ................ 713/202 |
| 2003/0074585 A1* | 4/2003 | Charbonneau ............. 713/202 |

OTHER PUBLICATIONS

Chinitz, J., "Single Sign-On: Is It Really Possible?", *Information Systems Security*, 2000, 9(3), 32-45.

Kilgallen, L.J., "The Hazards of Single Sign-On", *Computer Security Journal*, 1994 10(1), 1-9.

Kornievskaia, O., et al. "Kerberized Credential Translation: A Solution to Web Access Control", *Proceedings of the 10th USENIX Security Symposium*, 2001, 235-249.

Mouly, D., "Single Sign-On: Disspelling the Myths", *Network Computing*, 2001, 11(1), 28-29.

Volchkov, A., "Revisiting Single Sign-On, A Pragmatic Approach in an New Context", *IT Professional*, 2001, 3(1), 39-45.

\* cited by examiner

| NTD | NTU | XA | XU |
|---|---|---|---|
| Redmond | henry | UNIX1 | HSMITH |
| Redmond | james | UNIX1 | JJONES |
| Redmond | james | IBM | JJ |
| . | . | . | . |
| . | . | . | . |
| . | . | . | . |

| NTD | NTU | NTP |
|---|---|---|
| Redmond | henry | 'dog' |
| Redmond | james | 'cat' |
| . | . | . |
| . | . | . |
| . | . | . |

| XA | XU | XP |
|---|---|---|
| UNIX1 | HSMITH | 'fish' |
| UNIX1 | JJONES | 'bird' |
| IBM | JJ | 'elephant' |
| . | . | . |
| . | . | . |
| . | . | . |

PASSWORD SYNCHRONIZATION IN A SIGN-ON MANAGEMENT SYSTEM

FIELD OF THE INVENTION

The present invention relates generally to the field of distributed computing. More particularly, the invention provides a mechanisms to synchronize passwords that are used across heterogeneous domains in a distributed computing environment.

BACKGROUND OF THE INVENTION

In a distributed computing environment, resources or services that a user needs to access may be spread out across different computers. As one example, each employee in an enterprise may have a desktop or laptop computer, which accesses files stored in a central cluster of file servers. Each of these various computers may be controlled by a sign on procedure that requires presentation of credentials. For example, the user may have to enter a valid userID/password combination in order to gain access to his desktop or laptop computer. Typically, once a user is signed onto his or her desktop or laptop, he or she does not have to enter a userID/password combination again in order to access the file server, because the file server and the user's computer are part of the same domain.

However, in some cases a user may be working in a first domain (e.g., an environment based on the MICROSOFT WINDOWS operating systems), and may need to access information in a second domain of a different type (e.g., a cluster of computers based on the UNIX operating system). (Domains that differ from each other in this manner may be referred to as "heterogeneous.") The second domain may maintain its own userIDs and passwords, and may require that the user sign onto the second domain separately. Conventionally, when the user attempts to access the second domain, the second domain will present the user with a prompt to enter "credentials" (e.g., a userID and password) for the second domain, which is clearly an inconvenience to the user. It is desirable to provide a software system that signs a user of the first domain onto the second domain seamlessly, by automatically tendering that user's corresponding userID/password combination to the second domain. Such a system may be referred to as a "single sign-on" ("SSO") system.

An SSO system may include a database that stores the user's credentials for the various domains that the user may need to access. Thus, when the SSO system needs to sign the user onto a different domain than the domain that the user is already signed onto, the SSO system can look up that user's corresponding userID/password in the other domain. However, the SSO system's ability to sign the user onto another domain is dependent upon the system having access to an up-to-date password for the user in that other domain. Thus, when the user changes his password in any domain, the database should be synchronized to those changes, so that it will have the user's current password. In some cases, it may also be desirable to synchronize passwords between domains, such that a given user's password in all domains will be the same.

The present invention provides a mechanism to support such synchronization, which has not been realized in the prior art.

SUMMARY OF THE INVENTION

The present invention provides a mechanism to support the synchronization of an SSO system's database with the actual password records maintained by the various domains with which the SSO system operates. A given user may have accounts in both a first domain and a second domain. The user has a first userID/password combination in the first domain, and a second userID/password combination in the second domain. The SSO system's database contains tables that store the user's passwords in the first and second domain, and that correlate the user's userID in the first domain with his userID in the second domain. Thus, when a user is in one domain and needs to access the other domain, the SSO system looks up the user's corresponding userID/password for the other domain, so that the userID and password may be tendered to the other domain.

If the user changes his password in the first domain, a component in the first domain detects that the password has been changed. This change is then reported to the database, and the appropriate table in the database is changed to reflect that the user's password in the first domain has been changed. After the database has received the change to the user's password, optionally the second domain may be notified of the change, so that the user's password in the second domain may be changed to match the user's password in the first domain. When the user's password in one domain is changed in order to match a password that the user has set in another domain, this change is referred to as "replication" or "full synchronization."

When a change to a password in the first domain is detected, the component that detects the change preferably determines whether the change is: (1) a change to the password that actually originated in the first domain, or (2) a change that was made in order to replicate a password change originating in another domain. In case (2), it can be presumed that the database has already been modified to reflect that password change, and does not need to be notified again. If password changes of any type generated notification, then in the replication situation password changes would continue to "bounce" back and forth between the two domains in perpetuity; avoiding notification in type (2) situations prevents this perpetual "bounce" from occurring, and thus serves as a type of "dampening" on the synchronization process.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 4 is a block diagram of an exemplary mapping table;

FIG. 5 is a block diagram of an exemplary local password table;

FIG. 6 is a block diagram of an exemplary external credentials table;

DETAILED DESCRIPTION OF THE INVENTION

Overview

A single sign-on ("SSO") system can be used to allow a user of one domain to seamlessly access another domain by logging on with only 1 set of credentials. The SSO system maintains records of the user's userID/password in each domain, so that the SSO system can sign a user of one domain onto another domain by looking up, and tendering, the user's userID and password to the other domain. In order for this mechanism to work, the records maintained by the SSO system should have the up-to-date version of the user's password. A technique is described below whereby the SSO system's copy of a password may be synchronized to any password changes that take place in the different domains.

Exemplary Computing Environment

Figure 1:
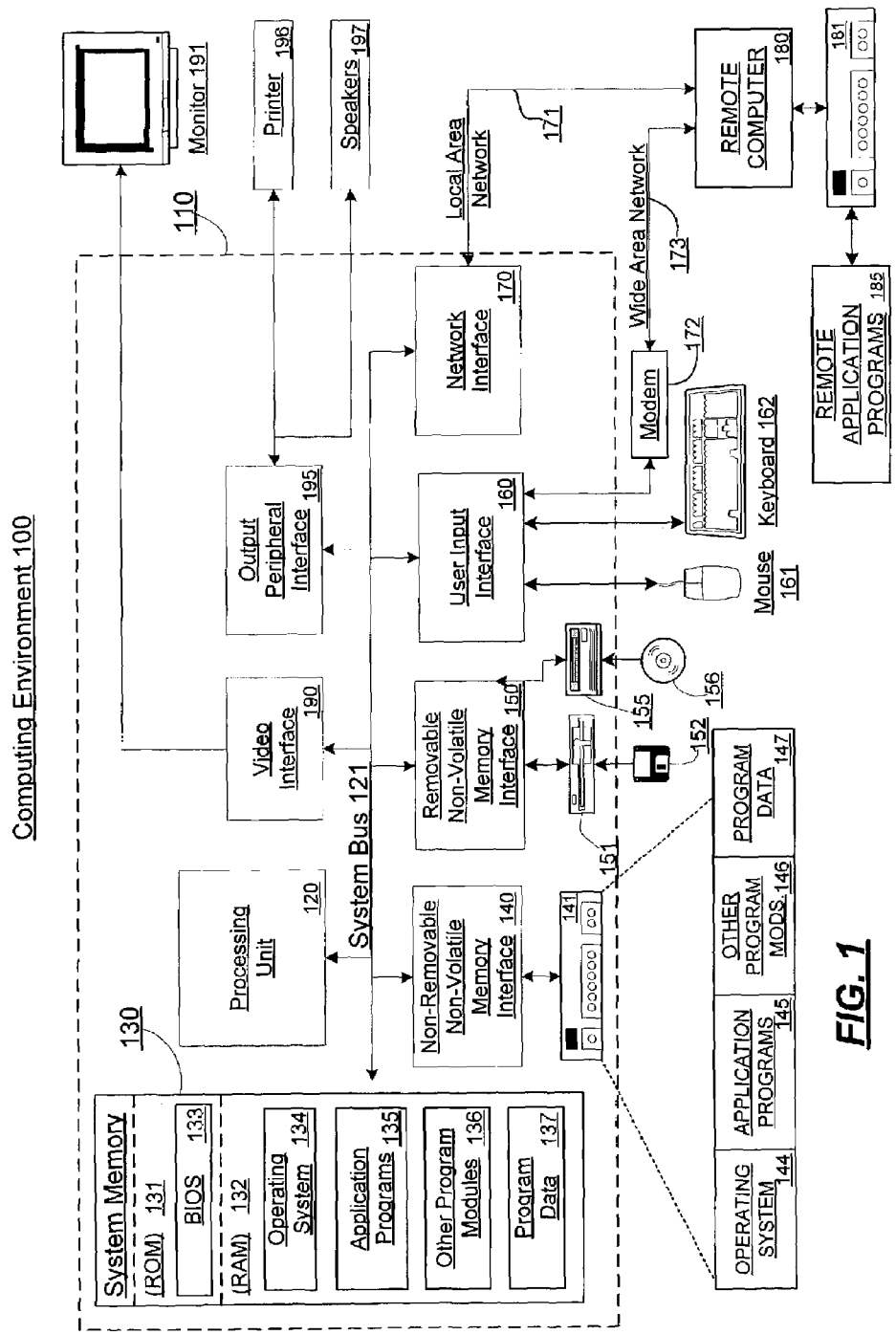
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Multi-Domain Heterogeneous Computing Environments

Figure 2:
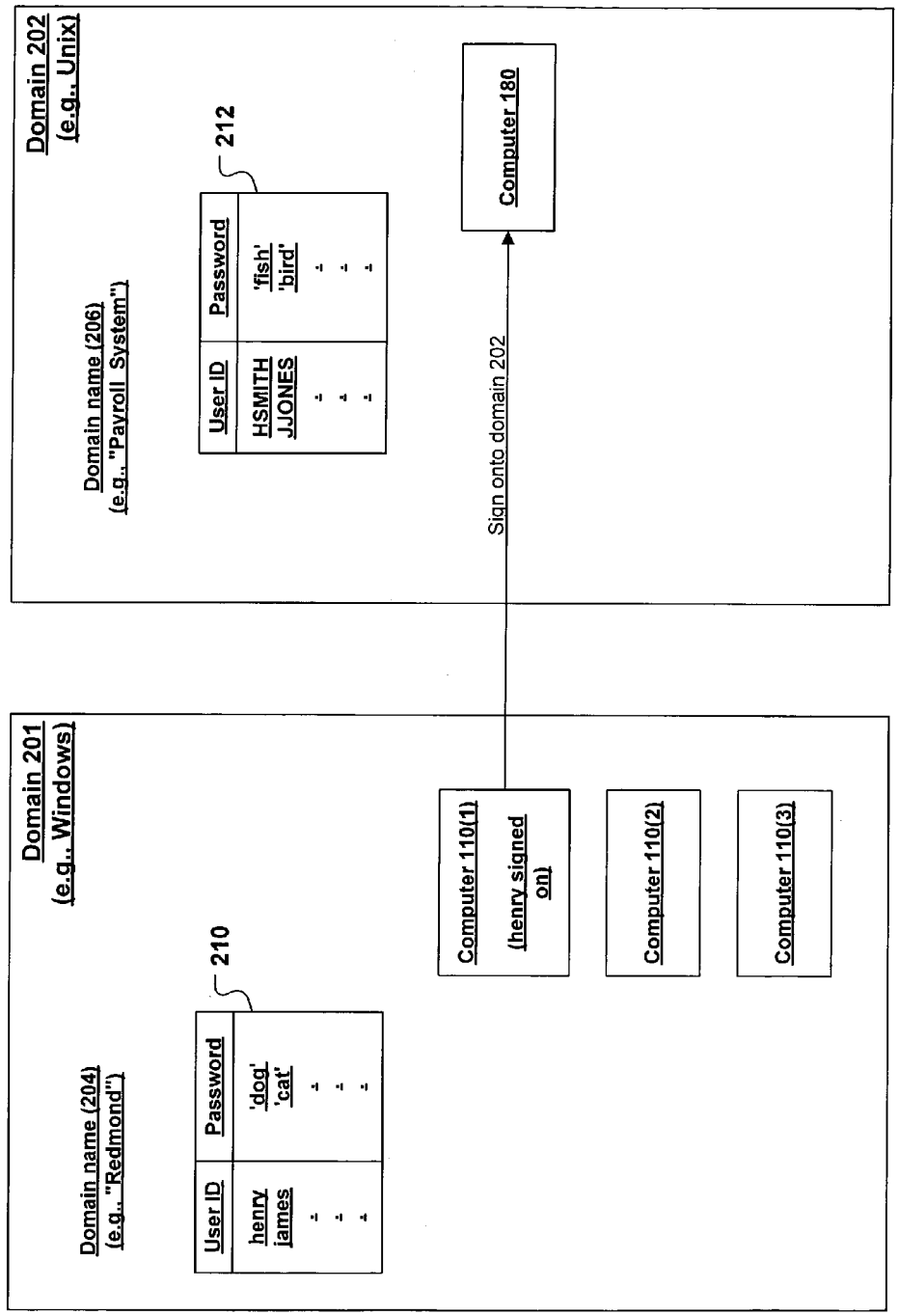
FIG. 2 is a block diagram of a setting in which a user signed on in a first domain may sign on to use an application in a second domain.

The need for password synchronization may arise in a distributed computing scenario in which computing resources are spread out across two or more domains, where each domain maintains its own userID/password table. For example, the domains may be different types of computing environments that have incompatible password systems—e.g., one domain may be based on the MICROSOFT WINDOWS operating systems, and the other domain may based on the UNIX operating system. Environments of different types may be referred to as "heterogeneous." When a user is working in one domain, it may be necessary for the user to access resources or services that are located in another domain, and thus the user may have to tender their "credentials" (e.g., a userID/password combination) for the other domain in order to gain access to the second domain. FIG. 2 shows an exemplary setting in which this situation may occur.

FIG. 2 shows domains 201 and 202. Each of the domains typically has a name 204 and 206 associated therewith. Thus, in this example, domain 201 has the name "Redmond," and domain 202 has the name "payroll system." (It will be noted that domain names can be assigned in any manner—e.g., by geography, by function, by department within an organization, etc. The domain name is merely for identification.) Each of the domains is a computing environment in which some set of resources (e.g., files, applications, services, etc.) may be available to users who have valid credentials for the domain. In this example, computers 110(1), 110(2), and 110(3) participate in domain 201. A user may login (or "sign on") to a computer as a particular user, thereby gaining access to all of the resources in domain 201 to which that particular user is entitled. In the example of FIG. 2, a user named "henry" is signed onto computer 110(1). There may be certain resources in domain 201 to which any logged-in user is entitled, and there may be other resources to which access is granted or denied based on which user is requesting access. By signing on as "henry," the user of computer 110(1) gains access to all resources in domain 201 that are generally available to users of domain 201, and also to the specific resources that "henry" is permitted to access.

Access to domain 201 (and to the resources that a particular user is permitted to access within that domain) is controlled by "credentials." In the example of FIG. 2, the credentials are a user identifier ("userID") and password combination. At the initiation of a session in domain 201, the user is asked to present a valid userID and password combination. If a valid combination is presented, then the user gains access; if a valid combination is not presented, then the user does not gain access.

The set of valid credentials is maintained in a credential record 210. In the example of FIG. 2, credential record 210 is a table that correlates each known userID with it's correct password. Credential record 210 shows that "henry" and "James" are valid userIDs for domain 201, with passwords "dog" and "cat," respectively. It should be understood that credential record 210 is merely exemplary, and a variety of other types of credential records are possible. For example, as an alternative to storing the actual password for a given userID, credential record 210 could store a hash of the password, a reference to a password stored elsewhere, or any other type of information that can be used to determine whether a userID/passwords combination is valid.

A user within domain 201 may need to access a computer in a separate domain 202. For example, computer 180 may participate in domain 202, and a user who is signed onto domain 201 may need to access a service provided by computer 180. Domain 202 maintains its own credential record 212, which is different from credential record 210. Thus, a userID/password combination that is valid in domain 201 may not be valid in domain 202. In this example, credential record 212 does not list "henry" and "james" as valid users, but does list "HSMITH" and "JJONES" as valid users.

It may be the case that a given person has a set of valid credentials in both domains 201 and 202. For example, a person named "Henry Smith" may have the userID "henry" in domain 201, and "HSMITH" in domain 202. Moreover, there may be some services that Henry Smith needs to access in domain 202 while working in domain 201. Thus, Henry Smith, while signed on as "henry" in domain 201 may use remote communications software to access domain 202 (e.g., by connecting to computer 180), and may then use his valid credentials in domain 202 to gain access to those services. Conventionally, when Henry Smith contacts a computer in domain 202, he will be prompted to enter his userID/password combination, at which time Henry Smith would enter "HSMITH" as the userID and "fish" as the password. However, it may also be the case that a software component running in domain 201 is aware that "henry" has a corresponding account in domain 202, and, when "henry" needs to access domain 202, the software component can tender the userID/password combination HSMITH/fish on his behalf.

Figure 3:
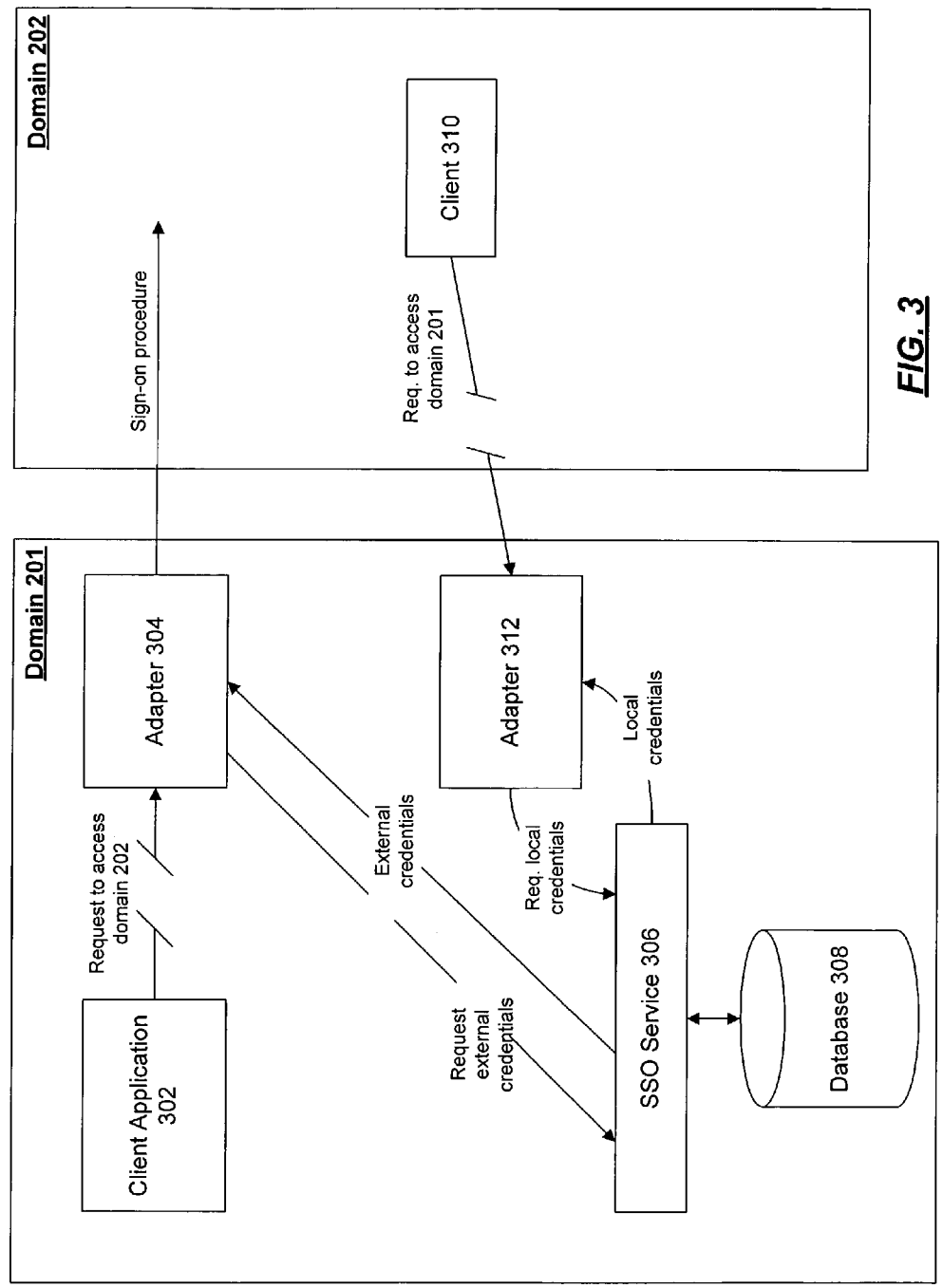
FIG. 3 is a block diagram of an architecture in which a user who is signed onto one domain may gain access to another domain.

FIG. 3 shows an environment in which a user who is signed onto one domain may gain access to another domain, by having a software component tender that user's credentials on his behalf.

In a first example scenario, a user is signed-onto domain 201, and needs to access domain 202. In FIG. 3, a client application 302 is running in domain 201, under a particular userID that is valid for domain 201. For example, client application 302 may be running under the userID "henry." Client application 302 could be an accounting application that may need to access payroll records that are stored in domain 202. At some point during the operation of client application 302, a request is made to access domain 202. The request is routed to adapter 304. Adapter 304 is a software component that will negotiate the presentation of "henry's" credentials to domain 202 in order to gain access to domain 202 on "henry's" behalf. The broken line between client application 302 and adapter 304 indicates that there may be various participants in the routing of an access request from client application 302 to adapter 304. It is assumed in the example of FIG. 3 that adapter 304 somehow receives a request to access domain 202 on "henry's" behalf; however, for the purpose of the description herein, there is no particular requirement or limitation as to how this request reaches adapter 304.

Once adapter 304 receives a request to access domain 202 on "henry's" behalf, adapter 304 requests "henry's" corresponding credentials for domain 202. (The credentials for domain 202 are referred to, in FIG. 3, as "external credentials," since they are credentials for a domain external to the domain 201 from which "henry's" access request originates.) Adapter 304 preferably issues the request to an SSO service 306. SSO service 306 communicates with database 308, in which external credentials are stored. (Exemplary tables that may be contained within database 308 are described below in connection with FIGS. 4–6.) After retrieving the external credentials from database 308, SSO service provides the external credentials to adapter 304. Adapter 304 then performs the sign-on procedure for domain 202, using the credentials that it has received from SSO service 306. For example, where the credentials comprise a userID/password combination, adapter 304 may present the userID and password to a sign-on routine in domain 202.

In a second example scenario, a user is signed onto domain 202, and needs to access domain 201. In the example of FIG. 3, domain 202 does not have access to the password list for domain 201—e.g., domain 201 may not trust domain 202 with its password list. Thus, in this example scenario, there is no component in domain 202 that can retrieve a valid userID/password combination for domain 201, so domain 202 accesses domain 201 using a technique described below.

Client application 310 runs in domain 202. At some point during the operation of client application 310, client application 310 needs to access domain 201. Thus, client application 310 issues a request to access domain 201, which ultimately reaches adapter 312 in domain 201. The broken line between client application 310 and adapter 312 indicates that there may be various participants in the routing of an access request between client application 310 and adapter 312. It is assumed, however, that the request from client application 310 ultimately reaches adapter 312 in some manner.

As described above, adapter 304's function is to perform a sign-on procedure with domain 202. Adapter 312's function, however, is to sign itself onto domain 201, and to perform whatever function in domain 201 has been requested by client application 310. Since adapter 312 is located in domain 201, the passwords needed to sign onto domain 201 need not be shared with domain 202.

The access request made by client 310 preferably indicates: (1) the identity of the user in domain 202 who is requesting access, and (2) an action or set of actions that the user wants to perform in domain 201 (e.g., retrieving a file stored in domain 201). When adapter 312 receives this access request, it contacts SSO service 306 to obtain an access token for the userID in domain 201 that corresponds to the requesting user in domain 202. SSO service 306 obtains this userID from database 308. Tables are stored in database 308 that contain the credentials needed to access domain 201, as well as the correlation between userIDs in domain 201 and user IDs in domain 202. Thus, given the userID of the user who is operating client 310 in domain 202, that user's corresponding userID/password in domain 201 can be identified based on information contained in database 308. Preferably, domain 202 supplies adapter 312 with credentials that correspond to client 310 in domain 202, thereby allowing client 310 to be authenticated.

Once SSO service 306 has retrieved the appropriate userID from database 308, SSO service 306 passes an access token for that userID to adapter 312. Adapter 312 then uses the access token to sign onto domain 201, and then executes a thread that performs whatever actions were specified in the request from client 310.

Figure 7:
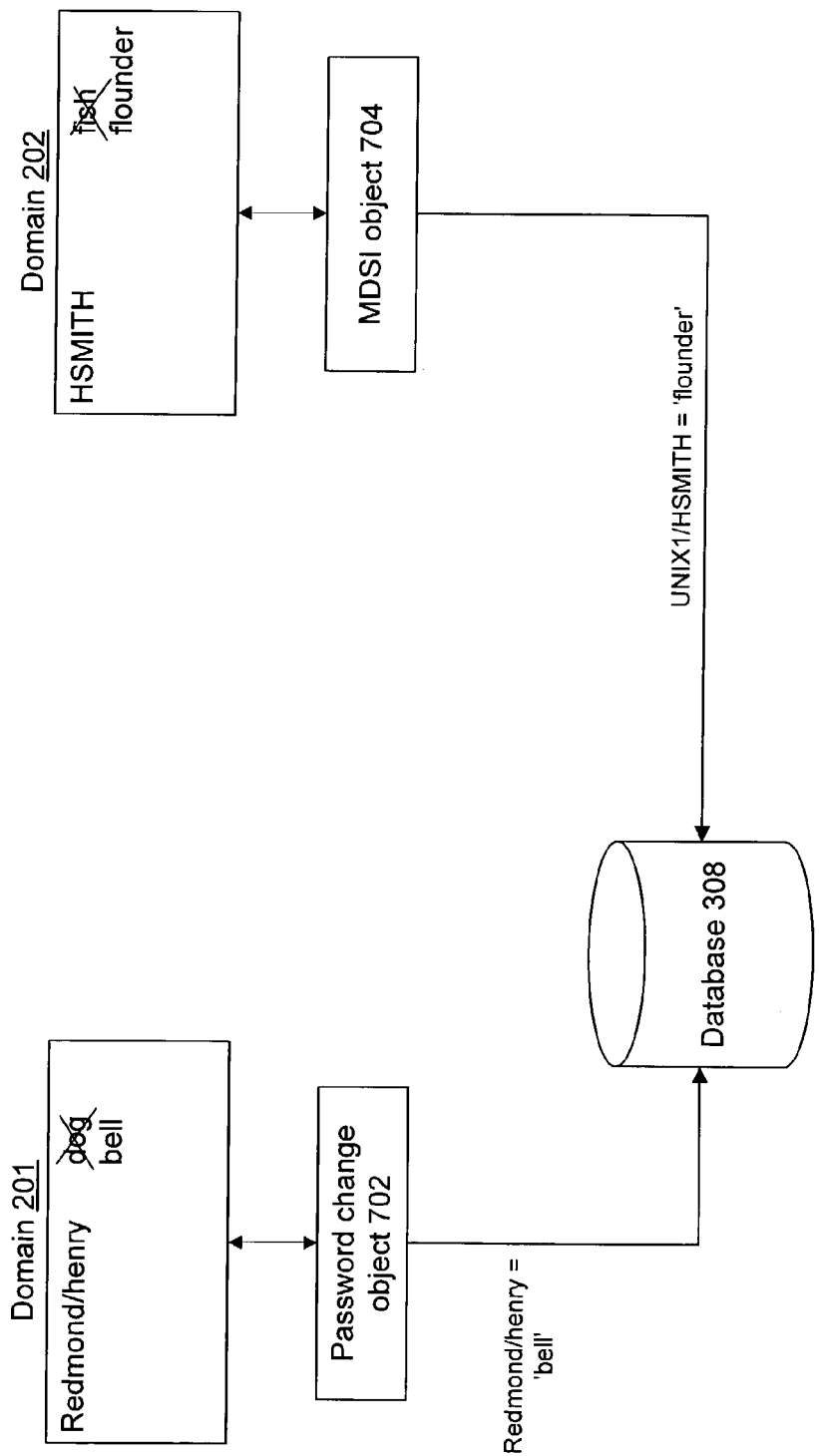
FIG. 7 is a block diagram of an exemplary architecture in which a first exemplary password synchronization scenario may take place.
Figure 8:
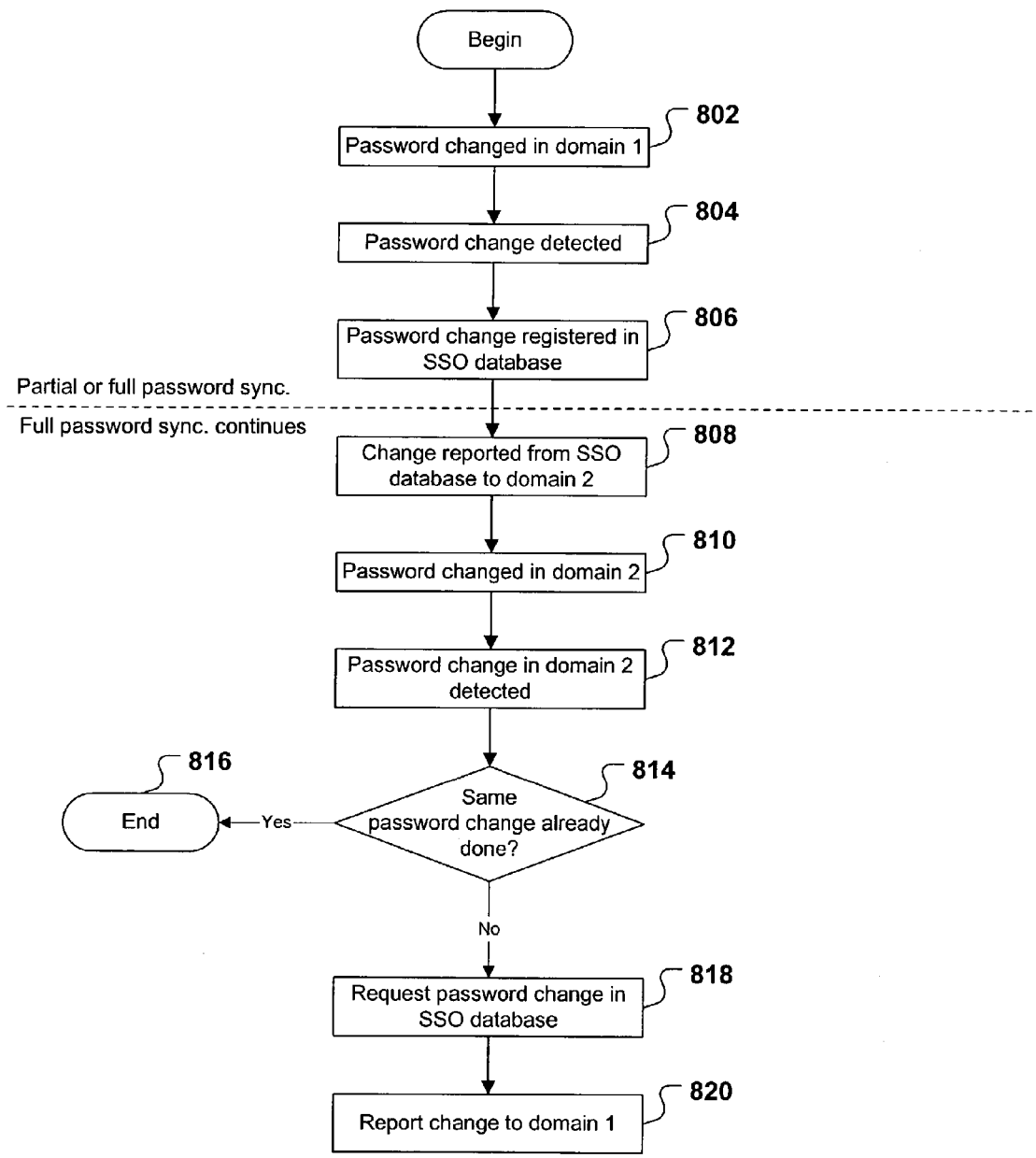
FIG. 8 is a flow diagram of a process for password synchronization.

It will be appreciated from the foregoing discussion that access to one domain from another by an SSO system requires that the userID/password combinations needed to access either domain be stored in database 308. Thus, if a user changes his password in either domain, then database 308 should be kept updated so that it has a user's current passwords for domains 201 and 202. FIGS. 7 and 8, described below, provide a mechanism by which database 308 may be synchronized to any password changes that arise in either domain 201 or domain 202.

Credential Tables

As described above, database 308 stores tables that contain the credentials needed to access domains 201 and 202, and also contains tables that correlate users in domain 201 with users in domain 202. These tables may need to be updated in the event that a password changes in domain 201 or domain 202. FIGS. 4–6 show exemplary tables that may be stored in database 308.

FIG. 4 shows an exemplary mapping table 401, which correlates users in domain 201 with users in domain 202. The attributes of the columns are NTD ("NT Domain"), NTU ("NT User"), XA ("eXternal Application"), and XU ("eXternal User"). (The use of "NT" in the first two attributes refers to the fact that the local domain 201 in which database 308 is stored is typically a MICROSOFT WINDOWS NT environment, or an environment based on a successor to the WINDOWS NT operating system, such as the WINDOWS 2000 or WINDOWS XP operating systems. However, it will be understood that the invention is not limited to the case where domain 201 is based on the WINDOWS operating system.) Each row of table 401 stores the name of the domain 201 (column NTD), the name of a user who may seek to access domain 202 (column NTU), the name of a particular external application to which access may be sought (column XA), and the user's corresponding userID for the external application (column XU). (In the last two columns, the "X" stands for "eXternal," referring to the fact that the domain that will be accessed is external to the domain in which the SSO system is located; the "A" in column name "XA" is for "application"; in full generality, an external entity, such as domain 202, to which a user may need to sign-on can be referred to as an "external application" or an "affiliate application.") In the example of FIG. 4, table 401 contains a row for the user "henry," indicating that he is in the "Redmond" domain, that he may access an affiliate application named "UNIX1," and that the user name that should be used in the affiliate application UNIX1 is "HSMITH." Similarly, the user "james" contains an entry indicating that he is in the "Redmond" domain, and can access the "UNIX1" affiliate application with the userID "JJONES." A user who is permitted to use more than one affiliate application may have more than one entry in table 401. For example, "james" may be able to access both domain 202 (i.e., UNIX1), and also a different domain or affiliate application (not shown) that may be named IBM. Thus, "james" has a second entry indicating that he can access the affiliate application named "IBM" with the userID "JJ".

FIG. 5 shows an exemplary local password table 501. Table 501 has three columns. The attributes of the columns are NTD, NTU, and NTP. NTD and NTU have the meanings described above, and NTP means "NT password". Thus, table 501 correlates a particular user in the local domain (e.g., domain 201) with his password in the local domain. Thus, "henry's" password is "dog", and "james's" password is "cat." In the example of FIG. 5, table 501 shows the same passwords for the users "henry" and "james" as are shown in the credential record 210 for domain 201 (shown in FIG. 2). In essence, table 501 is the SSO system's copy of the userID/passwords for domain 201.

FIG. 6 shows an exemplary external credentials table 601. Tabled 601 has three columns. The attributes of the columns are XA, XU, and XP. XA and XU have the meanings described above in connection with FIG. 4. XP means eXternal password—i.e., the password needed to gain access to an external domain. Thus, table 601 shows that the affiliate application UNIX1 can be accessed with the userID/ password combination HSMITH/fish, or JJONES/bird. Additionally, table 601 shows that another affiliate application named IBM (which may, for example, access a domain different from domains 201 or 202), can use the userID/ password combination JJ/elephant to access that other domain.

Tables 401, 501, and 601 may be used to correlate a user in one domain with his credential in another domain. For example, when a user (e.g., "henry") in domain 201 wants to access domain 202, the adapter that contacts domain 202 on "henry's" behalf requests henry's credentials from an SSO service. In the example of FIG. 2, this request may originate from the affiliate application UNIX1 (i.e., domain 202). Thus, when the SSO service receives the request for henry's credentials, it looks in table 401 to find an entry that has "henry" in the NTU column, "Redmond" in the NTD column (since "henry" is performing the access from the domain named "Redmond"), and UNIX1 in the XA column. Using that information, the SSO service finds the first row in table 401, which indicates that henry's corresponding userID in domain 202 (as shown in the XU column) is "HSMITH".

After determining that HSMITH is the userID to be used in domain 202, the SSO service then looks in table 601 to find the password for HSMITH. Thus, the SSO service in this example looks for a row of table 601 in which the entry for the XA column is UNIX1, and the entry for the XU column is HSMITH. Based on these criteria, the SSO service identifies the first row in table 601, which shows the password (in the XP column) as "fish". Thus, based on tables 401 and 601, the adapter has identified "henry's" corresponding userID/password combination in domain 202 as being HSMITH/fish.

Similarly, when an access request originates in domain 202 and is destined for domain 201, the SSO service can use a combination of tables 401 and 501 in order to locate the userID/password combination for domain 201 that corresponds to a user in domain 202. For example, if HSMITH is signed onto domain 202 and needs to access domain 201, then, as described above in connection with FIG. 3, domain 202 contacts an adapter in domain 201. The adapter in domain 201 contacts the SSO service to obtain HSMITH's corresponding userID/password in domain 201. The SSO service first looks in table 401, and determines that the domain/userID corresponding to HSMITH is Redmond/ henry. (It is assumed that an adapter that handles requests from a particular affiliate application knows which affiliate application the request came from and informs the SSO service. Thus, the SSO service, in this example, knows, by way of the adapter, that the request has come from an affiliate application named UNIX1, and that the current user is HSMITH, and thus that the correct row of table 401 can be identified based on the XA and XU columns.) After the domain/userID combination has been identified in table 401, the SSO service looks in table 501 to identify the password that corresponds to Redmond/henry. As indicated in table 501, this password is "dog." Thus, the SSO service returns the userID/password combination henry/dog to the adapter, and the adapter signs onto domain 201 as userID="henry", using the password "dog."

Synchronization of Passwords

As described above, adapters receive, from tables (such as tables 401, 501, and 601, shown in FIGS. 4–6) that are stored in a database, the appropriate userID/password credentials to sign onto a domain. Thus, those tables should be kept updated to reflect any changes to the passwords in the systems that the adapters will need to sign onto. If, for example, a user changes his password in domain 202, but that password change is not reflected in the tables database 308, then an adapter will attempt to sign onto domain 202 using an incorrect password, and access to domain 202 will be denied.

FIG. 7 shows an exemplary architecture that supports the synchronization of passwords. As previously discussed in connection with FIG. 2, domains 201 and 202 each maintain their own set of valid userID/password combinations, and a given person may have a valid userID/password combination in both domains 201 and 202. In the example of FIG. 7, the person Henry Smith is presumed to have the userID/password combination=henry/dog in domain 201, and HSMITH/fish in domain 202.

In the example of FIG. 7, it is presumed the password for "henry" in domain 201 has been changed from "dog" to "bell". Password change object 702 detects that the password for "henry" has been changed. As one example of how a password change can be detected, any password change in domain 201 may generate an event, that can be captured by password change object 702. If a change is detected, then password change object 702 sends an instruction to change henry's password in database 308. In the example of FIG. 3, an interface to database 308 is provided by SSO service 306, password change object 702 may request the change through SSO service 306. In another example, password change object 702 may be part of SSO service 306. The change to database 308 may, for example, result in changing table 501—e.g., by changing the NTP column to reflect that the password for Redmond/henry is now "bell" instead of "dog."

Similarly, a password change may arise in domain 202. For example, the password for HSMITH may change from "fish" to "flounder". An object in domain 202 (e.g., a Multiple Domain Synchronization Interface (MDSI) object 704) may determine that there has been a change to the password for HSMITH in credential record 212 (shown in FIG. 2). Object 704 may then communicate with database 308 in order to change the tables therein to reflect that the password for HSMITH in domain 202 is now "flounder." For example, the XP column in the first line of table 601 may be changed from the value "fish" to the value "flounder." In the case described above in which access to database 308 is mediated by SSO service 306, object 704 may communicate with an adapter in domain 201, which then uses SSO service 306 to request the change to table 601.

It should be noted that there are at least two types of password synchronization: (1) "partial" ("mapped") password synchronization, and (2) "full" ("replicated") password synchronization. Partial password synchronization means that database 308 is advised of changes to a given domain's password, but the same user is permitted to have different passwords in the different domains (e.g., Henry Smith uses the password "dog" in domain 201, and "fish" in domain 202). Full password synchronization means that if a user changes his password in one domain, then that change will affect the password for his corresponding account in another domain. Thus, under full password synchronization, if the password for userID "henry" in domain 201 changes from "dog" to "bell", then the password for HSMITH in domain 202 will change from "fish" to "bell". When partial password synchronization is employed, database 308 merely needs to be advised of changes to passwords that occur in domains 201 and 202. However, when full password synchronization is employed, after database 308 receives notice that a password has changed in one domain, that change is then communicated to the other domain. Thus, if the password for "henry" in domain 201 changes from "dog" to "bell", then it will be communicated to object 704 that the password for HSMITH in domain 202 also needs to be changed to "bell". Object 704 can then request that such a change be made to credential record 212. Similarly, if the password for HSMITH were to change in domain 202 from "fish" to "flounder", then after the change was reflected in database 308 password change object 702 would be notified that the password for "henry" in domain 201 needs to be changed to "flounder", and password change object 702 could request that such a change be made to credential record 210. In the case where access to database 308 is mediated by an SSO service, then the SSO service can advise objects 702 and 704 as to what passwords need to be changed.

When replication-type synchronization is being used, it is preferably performed in the following manner: When a password change is detected in one domain, the SSO database is changed to reflect the password change in that domain, and then other domains are notified. When those domains change their respective passwords in response to the notification, then those password changes are captured and recorded in database 308. For example, if a password in the WINDOWS domain (e.g., domain 201) changes, then this change is captured and used to change an entry in the WINDOWS password table 501 (shown in FIG. 5). The non-WINDOWS domain (e.g., domain 202) is then notified of the password change, and the password in that domain is changed in accordance with the notification. The password change in domain 202 is then captured, and that change is reflected in the external credentials table 601 (shown in FIG. 6). In other words, in a preferred embodiment, the record of a password in database 308 is changed after the actual password in the relevant domain, thereby ensuring that the SSO system's record of a password is not changed before the actual password is changed.

Figure 7A:
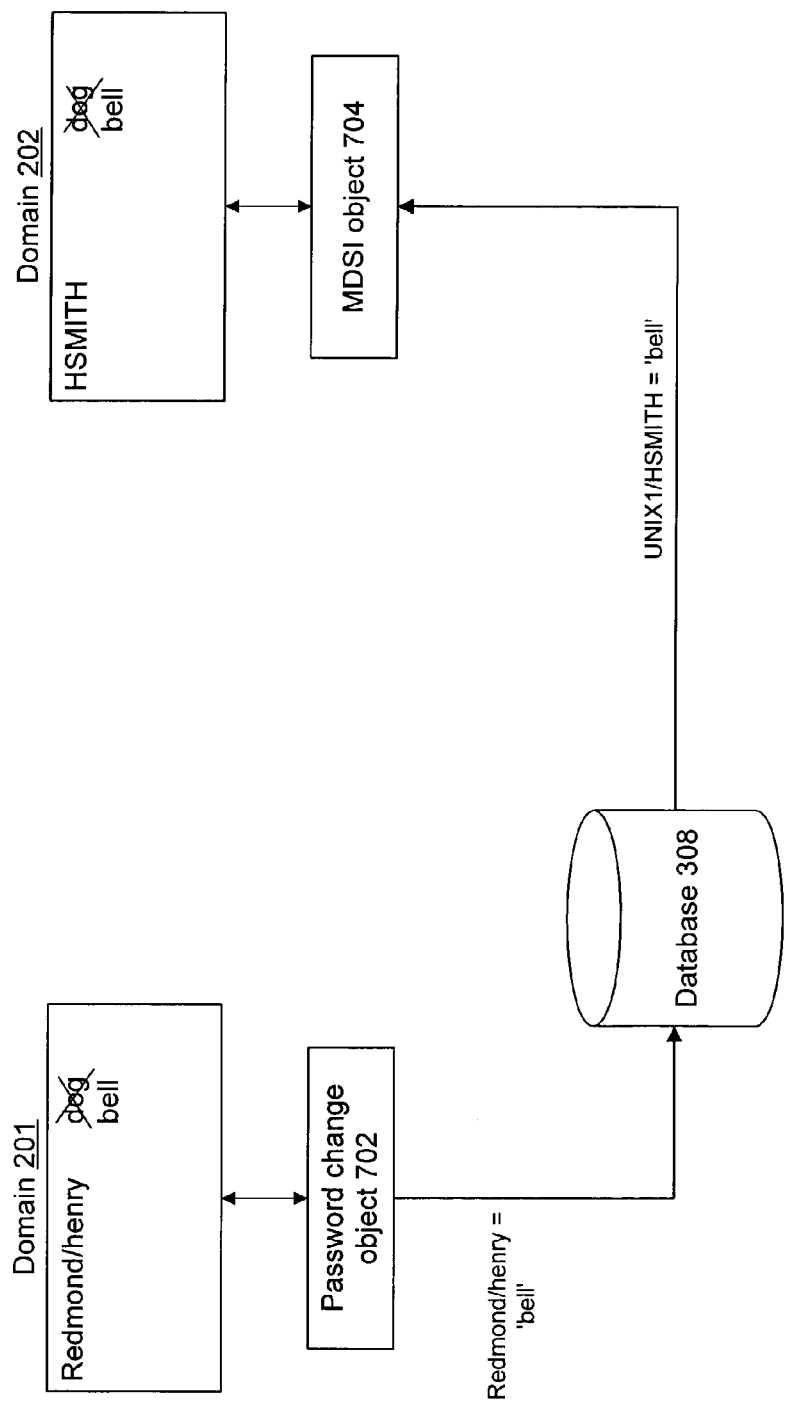
FIG. 7A is a block diagram of an exemplary architecture in which a second exemplary password synchronization scenario may take place.

FIG. 7A shows an example of password synchronization in "full" or "replicated" mode. As was the case in FIG. 7, there are two domains 201 and 202, each of which maintains its own userID/password combinations. Domain 201 is associated with password change object 702, and domain 202 is associated with MDSI object 704. Database 308 stores the password and mapping tables used by an SSO system. Since the example of FIG. 7A shows "full" or "replicated" mode, the passwords for corresponding users are the same. Since "henry" and "HSMITH" are different accounts for the same person, their passwords are the same. Initially, "henry" and "HSMITH" have the password "dog." At some point in time, the user "henry" in domain 201 changes his password to "bell". This password change is captured by password change object 702, and is registered in one of the password tables (e.g., the WINDOWS password table, if domain 201 is a WINDOWS-based environment) in database 308. The change is then reported to domain 202 through MDSI object 704, so that the password for HSMITH can also be changed to "bell". The password change in domain 202 then may be captured and reflected in an external credentials table in database 308. Preferably, password changes are only registered in database 308 if an entry for the corresponding userID exists in database 308; otherwise, the password change event is preferably disregarded by the SSO system—e.g., if "henry" has an entry in a table in database 308, then a password change originating in domain 201 causes this table to be updated with "henry's" new password; if "henry" does not have such an entry in database 308, then a change to "henry's" password in domain 201 is preferably disregarded by the SSO system.

It should be noted that, in the case of full password synchronization, there is a potential for password changes to bounce back and forth between domains 201 and 202 in perpetuity. For example, if "henry's" password in domain 201 changes from "dog" to "bell", that change will be detected by password change object 702, and will ultimately be reported to domain 202, wherein the credential records in domain 202 will reflect that the password for HSMITH has been changed to "bell". However, once the password for HSMITH is changed to "bell" in domain 202's credential records, object 704 will detect a password change and register this change in database 308, where the change will ultimately be reported to domain 201. Then, even though "henry's" password in domain 201 is already "bell", domain 201 may re-write that change into its credential records, and that change will (again) be detected by password change object 702. This process can potentially repeat itself forever. In a preferred embodiment, the objects that participate in a full password synchronization process include "dampening" logic that detects when password changes have become repetitive. Thus, when object 702 detects that a password change has occurred, object 702 determines whether the detected password changes has resulted from a user in domain 201 having changed his password, or if the password change was merely a replication of a change that occurred in domain 202. In the former case, the change must be reported to database 308, and ultimately replicated in domain 202. However, in the latter case, the detected change is already known to database 308 and domain 202, and thus does not need to be reported. Object 704 can behave likewise, distinguishing password changes that originated with a user in domain 202 from those that are merely the result of having synchronized domain 202 to changes that have already taken place in domain 201.

According to one feature of the invention, an environment may notify an SSO system of events relating to passwords, such as password expirations, password resets, etc., and these events may cause a password to be marked in database 308 as expired.

Additionally, it should be noted that an SSO system may expose an Application Programming Interface (API) that allows components (e.g., MDSI object 704) to be written in order to allow different types of environments to communicate with the SSO systems' password synchronization functionality. For example, such an API may expose functionality that allows an environment to notify the SSO system of password change events, password expirations, password reset events. Additionally, the API may allow an environment to receive notifications of password changes (e.g., in the case of "replicated" password synchronization) from the SSO system.

FIG. 8 shows a flow diagram of the password synchronization process. It is assumed, for the purpose of the example in FIG. 8, that there are two domains (1 and 2), and that a password change is first made by a user in domain 1.

Initially, a user in domain 1 changes his password (step 802). After the password change is made in the credential records for domain 1, the password change is detected (step 804), at which time the change is registered in the SSO database (step 806). If the type of password synchronization being performed is "partial," then the password synchronization process is complete at step 806, and ends.

If, however, full (replicated) password synchronization is being performed, then the storing of the password change in the SSO database causes the password change to be reported to domain 2 (step 808). The password is then changed in the credential records of domain 2 (step 810), such that the user's account in domain 2 will have the same password as his corresponding account in domain 1. After the password has been changed in domain 2, the change is then detected in domain 2 (step 812). As noted above, it is desirable to "dampen" password change detection, so that the same password change does not keep bouncing back and forth between domains 1 and 2 in perpetuity. Thus, the component that detects the password change in domain 2 determines whether the password change detected is, in fact, merely a replication of a password change that originated in domain 1 (step 814). If the password change merely the result of such a replication, then it is not necessary to report the password change to the SSO database, since the change has already been reported by domain 1. Thus, the process terminates (step 816). If however, step 814 determines that the detected password change is a genuine password change that originated in domain 2 rather than a replication of a password change that originated in domain 1, then the change is reported to the SSO database (step 818), whereupon it is reported to domain 1 (step 820). However, as noted above, the password change for a given domain is preferably not reflected in the SSO database until that password has actually been changed in that domain. Thus, if replication is in force and a user changes his password in the WINDOWS domain, the password change will be captured and reflected in the SSO database's WINDOWS password table, and then reported to the non-WINDOWS domain. When the non-WINDOWS domain changes the password, that change will be captured and then reflected in the SSO database's external credentials table. Dampening will prevent this change from cycling back and forth between the WINDOWS and non-WINDOWS domains in perpetuity.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method of recording a password change comprising:
   detecting that a first user of a first domain has changed a first password associated with said first user from a first value to a second value;
   reporting the change of the first password to a database that stores one or more tables that correlate a second user of a second domain with the first user and with the first user's associated first password; and
   determining that the change of the first password from the first value to the second value is not the result of a replication of a change to a second password associated with the second user, wherein the second domain associates the second user with a second password.

2. The method of claim 1, further comprising:
in the first domain, receiving from the first user a request to change the first password from the first value to the second value.

3. The method of claim 1, wherein said reporting act comprising:
reporting the change of the first password to a service that mediates access to the database.

4. The method of claim 1, wherein the one or more tables stored in the database comprise:
a first table that correlates users in the first domain with users in the second domain; and
a second table that correlates users in the second domain with passwords of users in the second domain.

5. The method of claim 4, wherein the method further comprises:
modifying the second table such that the second user is correlated with the second value.

6. The method of claim 1, further comprising:
requesting the second domain to change the second user's second password to the second value.

7. The method of claim 1, wherein the first user and the second user are personas in the first domain and second domain, respectively, for the same person.

8. A system that synchronizes password between a first domain and a second domain, the system comprising:
a detector that detects whether a first password associated with a first user in the first domain has changed from a first value to a second value;
a notifier that notifies a database that said first password has changed to said second value, said database storing one or more tables that correlate the first user with a corresponding second user in the second domain, and with a second password associated with the second user;
a dampener that determines whether a change to the first password that has been detected by said detector represents a replication of a change arising in the second domain, and that prevents said notifier from notifying the database of the change if the change represents said replication; and
a replicator that requests that the second domain change the second user's password to the second value.

9. The system of claim 8, where the one or more tables comprise:
a first table that correlates users in the first domain with said users' corresponding passwords;
wherein said database, in response to being notified that said first password has been changed to said second value, modifies said first table to correlate the first user with the second value.

10. The system of claim 9, wherein the one or more tables comprise:
a second table that correlates users in the first domain with users in the second domain.

11. The system of claim 8, wherein the replicator uses the database to determine that the second user corresponds to the first user.

12. A computer-readable storage medium encoded with computer-executable instructions to perform a method of password management, the computer-executable instructions being adapted to perform acts comprising:
receiving notice that a first password associated with a first user in a first domain has changed from a first value to a second value;
updating a database to reflect that said first password has changed to said second value, said database correlating users in said first domain with users in a second domain;
determining that the change of the first password from the first value to the second value is not a replication of a change that originated in the second domain; and
requesting that a second password associated with a second user in said second domain be changed to said second value.

13. The computer-readable storage medium of claim 12, the computer-executable instructions being adapted to perform acts further comprising:
receiving a request from a second user in said second domain to access said first domain, said first user and said second user being personas for the same person in said first domain and said second domain, respectively;
consulting the database to obtain the first user's password; and
using the first user's password to obtain access to the first domain on behalf of the second user.

14. The computer-readable storage medium of claim 12, wherein the database correlates said first user with said second user.

15. The computer-readable storage medium of claim 12, wherein said database stores:
a first table that correlates users in said first domain with users in said second domain; and
a second table that correlates users in said first domain with the corresponding passwords of said users in said first domain.

16. The computer-readable storage medium of claim 15, wherein said act of updating said database comprises modifying an entry in said second table.

17. The computer-readable storage medium of claim 12, wherein the computer-executable instructions expose, through a programming interface, methods which permit a component to send a notification of a password change.

18. The computer-readable storage medium of claim 12, wherein the computer-executable instructions are adapted to perform acts further comprising:
marking as expired a password stored in the database in response to a notification from the second environment that a password expiration or password reset event has occurred in the second environment.

19. The computer-readable storage medium of claim 18, wherein the computer-executable instructions expose, through a programming interface, one or more methods that permit a component to send a notification of said password expiration or password reset event.

* * * * *